July 17, 1951  C. K. GARRISON  2,561,017
SAFETY HOOK
Filed July 8, 1949
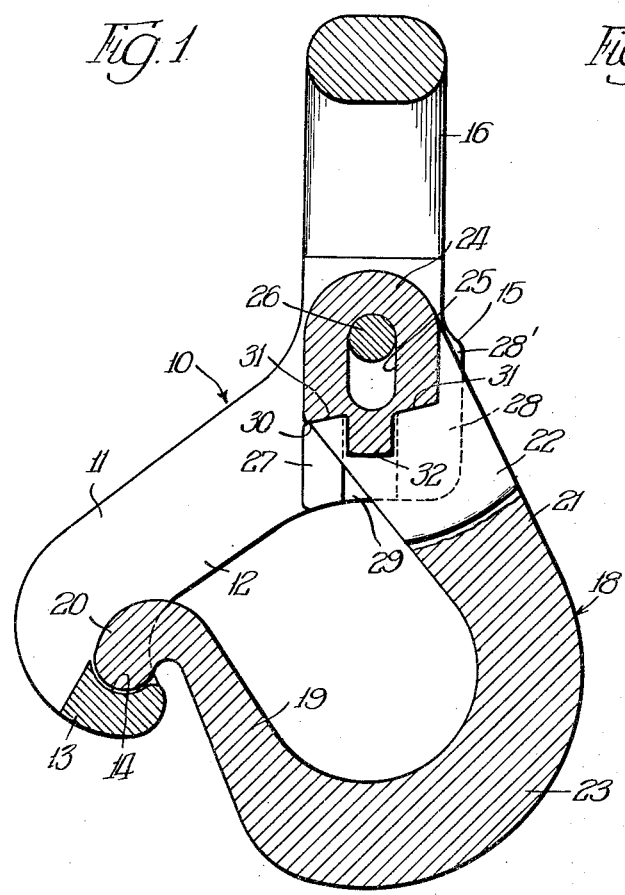
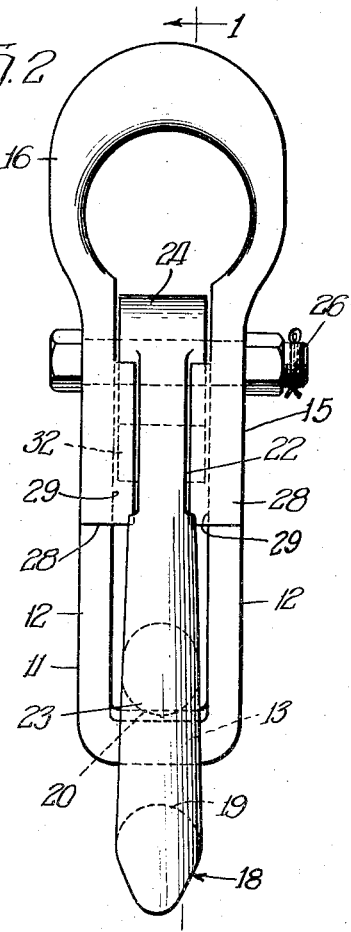
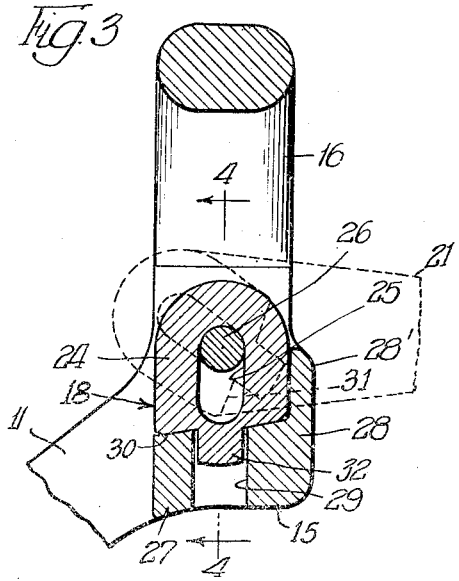
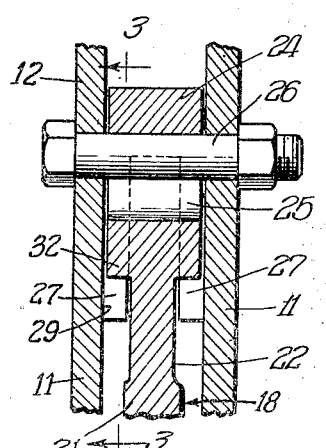
INVENTOR.
Charles K. Garrison,
BY
Cromwell, Greist & Warden
Attys Patented July 17, 1951

2,561,017

UNITED STATES PATENT OFFICE 2,561,017

SAFETY HOOK

Charles K. Garrison, Chicago, Ill., assignor to Chicago Steel Foundry Company, Chicago, Ill., a corporation of Maine Application July 8, 1949, Serial No. 103,665

2 Claims. (Cl. 24—232)

The present invention relates to an improved and strengthened safety lifting hook of the type commonly used with cable tackle in the hoisting of heavy loads.

It is an object of the present invention to provide a safety hook of the foregoing type characterized by a factor of safety which is substantially greater than that of existing hooks of the same general type.

A more specific object is to provide an improved safety hook construction including a cable connected clevis and a lifting hook pivotally mounted on the clevis, in which the free lip or bill of said hook is engageable with an integral crossbar of said clevis to partially sustain the load on the hook, and in which improved provisions are made whereby the pivot which connects the hook to the clevis is relieved of shearing stress imposed by the load.

It is another specific object of the invention to provide a safety hook assembly of the sort referred to in which said clevis element and hook element are movably connected by a sliding or floating, pin and slot type, pivotal connection and have coacting, abutting surfaces which are engageable with one another in the operative load sustaining position of the clevis and hook elements, and in which a lug and socket arrangement on said elements positively resists any tendency of the hook to rotate or shift laterally relative to the clevis after being properly seated against the latter, the engagement of the hook and clevis seating surfaces serving to relieve the above mentioned, pin and slot pivotal connection of said hook and the clevis from shearing stress.

A still further object is to provide an assembly as described in the preceding paragraph in which the lug and socket arrangement is self-cleaning.

Yet another object of the invention is to provide a safety hook construction of the type referred to above which is adapted to be produced at a relatively small cost, since it eliminates comparatively costly machining operations, and may be fabricated of relatively inexpensive castings, rather than forgings, without loss of strength or load bearing capability, in fact with increased strength.

The foregoing statements are indicative in a general way of the nature of the invention, but other and more specific objects will be apparent to those skilled in the art upon a full understanding of the construction and operation of the device.

A single embodiment of the invention is presented herein for purpose of illustration, but it will be appreciated that the invention is susceptible of incorporation in other modified forms coming within the scope of the appended clamis.

In the drawings,

Fig. 1 is a view in vertical, longitudinal section through the hook construction, approximately along line 1—1 of Fig. 2;

Fig. 2 is a rear view of the hook assembly illustrated in Fig. 1;

Fig. 3 is a fragmentary view in vertical cross section along a line generally corresponding to line 3—3 of Fig. 4, illustrating in solid and dotted lines the action of the hook element in engaging and disengaging the load sustaining seat and locking slot of the clevis; and Fig. 4 is a fragmentary view in section along a line corresponding to line 4—4 of Fig. 3, further illustrating details and relationships of the pivoting parts of the structure.

Referring to the drawings, the reference numeral 10 generally designates the clevis of the safety hook, this clevis being fabricated of a one-piece, heat treated steel casting. Clevis 10 includes a forwardly and downwardly projecting portion 11 constituted by a pair of parallel arms 12 which are integrally connected at their outer, downturned ends by a transverse crossbar 13. This crossbar is shaped to provide an upwardly spacing, concave, hook engaging keeper seat 14. The clevis is provided with an intermediate heel 15 at which the arms 12 are of thickened cross section and are otherwise specially shaped for the purposes to be described. Upwardly of said heel 15 the clevis 10 has a bail 16 adapted to be engaged by a cable or other piece of tackle to suspend the hook and its load.

The hook element of the assembly is generally designated 18. It is provided with a forwardly and upwardly curved bill or tongue 19 terminating in a rounded nose 20 which is engageable with the keeper seat 14 of the clevis crossbar 13. The shank 21 of hook element 18 is thinned or flattened somewhat in section at 22 (see Figs. 1, 2 and 4) intermediate the curved body portion 23, which is of rounded section, and the relatively thick boss 24 which is formed at the upper, pivoting end of the hook shank. Said boss is provided with a vertically elongated slot 25 which slidably receives a transverse pivot pin 26 carried by the clevis 10 adjacent the heel 15 thereof.

This thickened clevis heel is shaped to provide the pairs of inwardly projecting, laterally spaced abutments 27, 28 there being a pair of said abutments on each of the clevis arms 12 at the clevis heel. The spacing of the respective abutments from one another provides a vertically extending slot 29 on either clevis arm 12, as illustrated in Figs. 1, 3 and 4. Abutments 28 extend upwardly at the rear of the clevis heel to provide rear guide elements 28' for the boss 24 in seating and unseating the hook on the clevis.

The upper surfaces of the abutments 27, 28 are shaped to provide downwardly and forwardly inclined load receiving surfaces 30. These are adapted to coact with similarly inclined surfaces 31 which are formed on the bottom of the thickened boss 24 of the hook shank. Integral lugs 32 are formed on and extend downwardly from said hook boss 24 on either side of the shank 21. These lugs are receivable in the respective vertical slots 29 of the clevis heel when the hook 18 is in operative position, as illustrated in solid lines in Figs. 1, 2 and 4. It will be noted that said slots 29 extend entirely through the clevis heel 15 in the vertical direction to prevent foreign matter, dirt, etc., from accumulating and thus preventing full seating of hook 18 on clevis 10.

In use, the hook 18 is adapted to be lifted upwardly and swung rearwardly from the solid line position of Fig. 3 to the dotted line of that figure to disengage the hook from the clevis for the reception of the load. The parts are then reengaged, the hook tongue 19 being engaged in the clevis keeper seat 14 and the lugs 32 of boss 24 allowed to drop down in the respective clevis slots 29. The respective pairs of abutments 27 and 28 engage said lugs to hold the hook and clevis against relative rotation in this position and the respective surfaces 30 and 31 of said abutment members 27, 28 and boss 24 engage to sustain the load adjacent the heel of the clevis. The self-cleaning nature of slots 29 insures that this engagement will take place uniformly at all times without requiring attention. The load is thus removed from the pivot pin 26, so that there is no likelihood of failure of the latter under shear, and is distributed over a relatively wide area, reducing the stress on the hook boss and clevis abutments.

I claim:

1. A safety hook construction of the type characterized by a clevis and a hook element floatingly mounted on said clevis by a connection enabling vertical translational shifting and pivotal swinging of said hook element on said clevis, in which said clevis is provided with a vertically extending socket positioned in vertical alignment with said connection and said hook element is provided with a lug disposable in and removable from said socket by said vertical translational movement, thereby to enable said pivotal swinging of said hook element when the lug is removed from the socket, said socket extending through the material of the clevis and being open at the top and bottom to render the same self-cleaning, said clevis and hook element having abutment surfaces laterally adjoining said socket and lug respectively which are in vertical load transmitting engagement when said lug is operatively disposed in said socket.

2. A safety hook construction of the type characterized by a clevis element and a hook element floatingly mounted thereon by a connection enabling vetical tanslational shifting and pivotal swinging of said hook element on said clevis element, in which said clevis and hook elements are provided with a vertically extending lug and a lug-receiving socket positioned in vertical alignment with said connection, said lug and socket being defined by vertically extending abutments on adjacent surfaces of said respective elements, said lug being removable from said socket by said vertical translational movement, thereby to enable said pivotal swinging of said hook element, said clevis and hook elements having abutment surfaces of substantial area laterally adjoining said socket and lug respectively, which surfaces are in vertical load transmitting engagement when said lug is operatively disposed in said socket.

CHARLES K. GARRISON.

REFERENCES CITED

The following references are of record in the file of this patent:

UNITED STATES PATENTS

| Number | Name | Date |
| --- | --- | --- |
| 2,359,557 | Hoffman | Oct. 3, 1944 |
| 2,462,965 | Henderson | Mar. 1, 1949 |